US 6,732,235 B1

(12) United States Patent
Krivacek et al.

(10) Patent No.: US 6,732,235 B1
(45) Date of Patent: May 4, 2004

(54) CACHE MEMORY SYSTEM AND METHOD FOR A DIGITAL SIGNAL PROCESSOR

(75) Inventors: Paul D. Krivacek, Cambridge, MA (US); Jørn Sørensen, Aars (DK); Frederic Boutaud, Belmont, MA (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 09/707,239

(22) Filed: Nov. 6, 2000

Related U.S. Application Data
(60) Provisional application No. 60/163,816, filed on Nov. 5, 1999, now abandoned.

(51) Int. Cl.[7] .............................................. G06F 12/00
(52) U.S. Cl. ..................... 711/118; 711/130; 711/137; 711/147; 712/237
(58) Field of Search .................................. 711/118, 147, 711/137, 130; 712/237

(56) References Cited

U.S. PATENT DOCUMENTS

| | | | | |
|---|---|---|---|---|
| 5,887,067 A | * | 3/1999 | Costa et al. .................. | 381/81 |
| 5,898,892 A | * | 4/1999 | Gulick et al. ................ | 395/872 |
| 5,909,559 A | | 6/1999 | So | |
| 5,978,488 A | * | 11/1999 | Margolin ...................... | 381/61 |
| 5,987,549 A | | 11/1999 | Hagersten et al. | |
| 6,026,461 A | | 2/2000 | Baxter et al. | |
| 6,047,349 A | | 4/2000 | Klein | |
| 6,065,100 A | * | 5/2000 | Schafer et al. ............... | 711/137 |
| 6,115,478 A | * | 9/2000 | Schneider .................... | 381/314 |
| 6,131,113 A | * | 10/2000 | Ellsworth et al. ............ | 709/213 |
| 6,279,084 B1 | * | 8/2001 | VanDoren et al. ........... | 711/141 |
| 6,317,810 B1 | * | 11/2001 | Lopez-Aguado et al. ... | 711/120 |
| 6,367,006 B1 | * | 4/2002 | Tran ............................. | 712/244 |
| 6,370,614 B1 | * | 4/2002 | Teoman et al. .............. | 711/113 |
| 6,401,192 B1 | * | 6/2002 | Schroter et al. ............. | 712/207 |
| 6,460,115 B1 | * | 10/2002 | Kahle et al. ................. | 711/122 |

FOREIGN PATENT DOCUMENTS

| | | |
|---|---|---|
| DE | 197 13 178 A | 10/1998 |
| WO | WO 98/30948 A | 7/1998 |

* cited by examiner

Primary Examiner—Donald Sparks
Assistant Examiner—Ngoc V Dinh
(74) Attorney, Agent, or Firm—Wolf, Greenfield & Sacks, P.C.

(57) ABSTRACT

A digital signal processing system includes multiple processors, and one or more shared peripherals such as memory. The architecture includes plural bus masters, each connected to its own bus. There are also plural bus slaves, each connected to its own bus. A bus arbitration module selectively interconnects the buses, so that when the plural bus masters each access a different bus slave, no blocking occurs, and when the plural bus masters each access a same bus slave, bandwidth starvation is avoided. The architecture is supported by a bus arbitration method including hierarchical application of an interrupt-based method, an assigned slot rotation method and a round-robin method, which avoids both bandwidth starvation and lockout during extended periods of bus contention. The system further includes a cache memory system allowing one process to perform real-time digital signal processing according to a modifiable program stored in a modifiable non-volatile memory by temporarily loading portions of the program into a fast, local memory.

16 Claims, 9 Drawing Sheets

CACHE MEMORY SYSTEM AND METHOD FOR A DIGITAL SIGNAL PROCESSOR

CROSS-REFERENCE TO RELATED APPLICATION

This application is related to U.S. patent application Ser. No. 09/706,577, filed Nov. 3, 2000, by Rainer R. Hadwiger, Paul D. Krivacek and Joem Soerensen, and incorporated herein by reference.

This application claims domestic priority under 35 U.S.C. § 119(e) to U.S. Provisional Patent Application Serial No. 60/163,816, filed Nov. 5, 1999, now abandoned, and incorporated herein in its entirety by reference.

BACKGROUND

1. Field of the Invention

The present invention relates generally to small digital signal processor systems, such as mobile phones. The invention relates more specifically to systems in which a digital signal processor executes a software program or sequence of steps, which can be altered, modified or upgraded from time to time.

2. Related Art

Communications equipment, such as mobile phones performs a variety of signal and data processing functions. In older systems, a digital signal processor (DSP) processed digitized audio signals and a microprocessor control unit (MCU) controlled general system operations including communication set-up and tear-down for an individual equipment unit (e.g., phone). The DSP and the MCU of the simplest conventional systems communicate with each other through single-port and multi-port shared memory, control signals, etc. However, additional features and control options are possible when the DSP and MCU are permitted to communicate with each other, for example through a shared memory. Although systems wherein the DSP and the MCU do not communicate with each other are possible, the evolution of cellular communications to include support for digital data communications as well as audio communications has led to a greater need for the DSP and MCU to communicate with each other.

Communication standards also have been evolving and continue to evolve. Standards are often designed to be extensible, or new features cleverly designed to be backward compatible with an existing standard, so that the new features can be deployed to the field without the need to replace every piece of equipment already in the field. In order to accommodate such evolution, there is great pressure to move away from read-only memory (ROM) resident software or firmware to execute on the DSP or MCU. Modifying ROM resident software or firmware is difficult because generally ROM cannot be written to, except once at the time of manufacture.

Ultimately, the above-described pressures have resulted in the development of integrated circuits including a DSP, MCU, ROM and RAM. The monetary and size costs of adding RAM to integrated circuit systems have forced the DSP and MCU to share RAM whenever possible. In order to facilitate communication between the DSP and the MCU, and in order to avoid wasting any memory space, which as noted, is at a premium, they share RAM. System software is loaded into RAM in order to maximize flexibility and the ability to reconfigure systems to stay in conformance with evolving communication standards. However, when memory is shared, for example using the architecture illustrated in FIG. 1, the memory access bandwidth becomes a serious problem.

SUMMARY OF THE INVENTION

It is a general object of the present invention to provide an improved cache memory system and method, especially, although not exclusively, for a communication processor such as a digital signal processor (DSP).

According to one aspect of the invention, a digital signal processing system comprises a digital signal processor (DSP) performing real-time processing of digital audio signals, a modified non-volatile program storage memory connected through a bus to the DSP, and a cache memory system connected to the DSP and to the modifiable non-volatile program storage memory, the cache memory system having a program memory management unit which loads program instructions from the modifiable non-volatile program storage memory.

BRIEF DESCRIPTION OF THE DRAWINGS

In the drawings in which like reference designations indicate like elements.

DETAILED DESCRIPTION

The present invention will be better understood upon reading the following detailed description of some exemplary embodiments thereof.

When in the following discussion, a bus is mentioned, a set of signal paths connecting the functional units of the circuit, system or device under discussion is meant. A bus may include an addressing component and a data carrying component, each sometimes individually referred to as a bus. Most commonly, buses are configured to have two or more parallel signal paths carrying multi-bit wide data and address information, although serial buses are also known.

Figure 1:
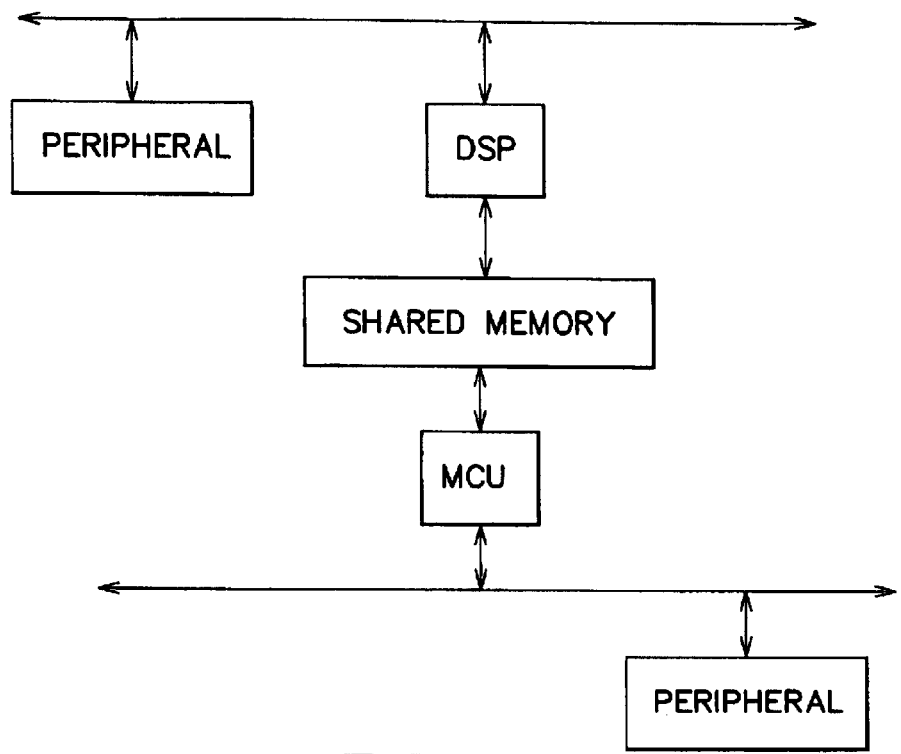
FIG. 1 is a schematic block diagram of conventional bus architecture including a shared memory.
Figure 2:
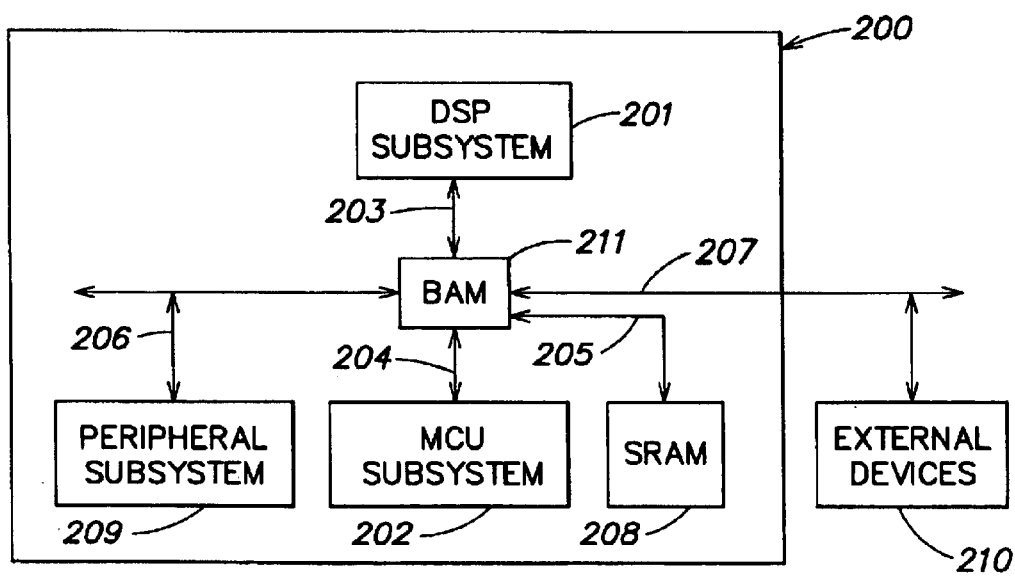
FIG. 2 is a simplified schematic block diagram of an exemplary bus architecture embodying aspects of the present invention.

FIG. 2 depicts a device 200, for example implemented as an integrated circuit. The device includes a digital signal processor (DSP) subsystem 201 and a micro-controller unit (MCU) subsystem 202. Within DSP subsystem 201 is a local bus (not shown) to which a processor is connected. A bus 203 provides an external (to the DSP subsystem 201) connection to the DSP subsystem 201 for other elements of the device 200; bus 203 may also be the local bus within DSP subsystem 201. Similarly, MCU subsystem 202 includes a local bus, the MCU bus 204, which provides an external (to the MCU subsystem 202) connection of the MCU subsystem 202 to other elements of the device 200. Each of the subsystems 201 and 202 discussed thus far includes a processor, thus providing the device 200 with plural processors. In order to improve the performance of each processor, it has been given its own subsystem (201, 202), together with its own local bus (203, 204, respectively). These will be discussed in greater detail, below. As noted above, the DSP subsystem 201 and MCU subsystem 202 include a DSP (discussed below) and an MCU (discussed below), respectively. Each of the DSP and MCU is a bus master, meaning each can request access through its respective local bus to other elements of the device 200. Each can also include plural internal buses, if design requirements are better met by such a structure.

Device 200 further includes three other buses 205, 206 and 207 to which various additional elements are connected. The other elements of the device 200 are bus slaves, which respond to requests for access from the bus masters. Memory, for example static random access memory (SRAM) which may be used as a shared system memory, is connected to bus 205. Various peripheral devices by which device 200 can perform its necessary functions are contained in a peripheral subsystem 209 connected to a peripheral bus 206. Finally, external devices 210, such as flash ROM, for example, are connected to an external bus 207. The partitioning of functions among the various devices, and buses mentioned above preferably is optimized by the designer for any particular purpose. In the embodiment presently described, various optimization choices have been made to render device 200 suitable for use as the heart of wireless mobile communications devices, such as a Global System for Mobile communications (GSM) telephone, a telephone supporting another communication protocol such as Code Division Multiple Access (CDMA), or devices supporting the Wireless Application Protocol (WAP).

The buses 203, 204, 205, 206 and 207 described above are interconnected through a bus arbitration module (BAM) 211 including a Direct Memory Access (DMA) subsystem (not shown). The configuration and operation of the BAM 211 is described in greater detail, below. That configuration and operation determines which buses can communicate with each other and at what times. The design and operation of the BAM 211 is optimized to guarantee a configurable minimum access bandwidth by the DSP subsystem 201 and the MCU subsystem 202 to any of the other system elements required, and to prevent one subsystem 201, 202 from locking out the other subsystem 201, 202.

In the illustrative embodiment of device 200, all bus masters, including DSP subsystem 201 and MCU subsystem 202, employ a common, unified address space. A number of important advantages can be obtained by use of a unified address space. For example, DSP subsystem 201 and MCU subsystem 202 can exchange data or code in SRAM 208 merely by passing a pointer to the data or code to be exchanged, by writing the pointer to a globally known location. According to another advantage of a unified address space, the logic required for address decoding in the BAM 211 is greatly simplified because the same decoding is required regardless of which bus master or bus slave is involved in a particular transaction. According to net another advantage of the unified address space, a very symmetrical system is achieved. Since both the DSP and MCU use the same address space, code can be more easily ported from one device to the other. Therefore, the designer can better partition code between the DSP and MCU, avoiding critical path problems and processor overloading.

Figure 3:
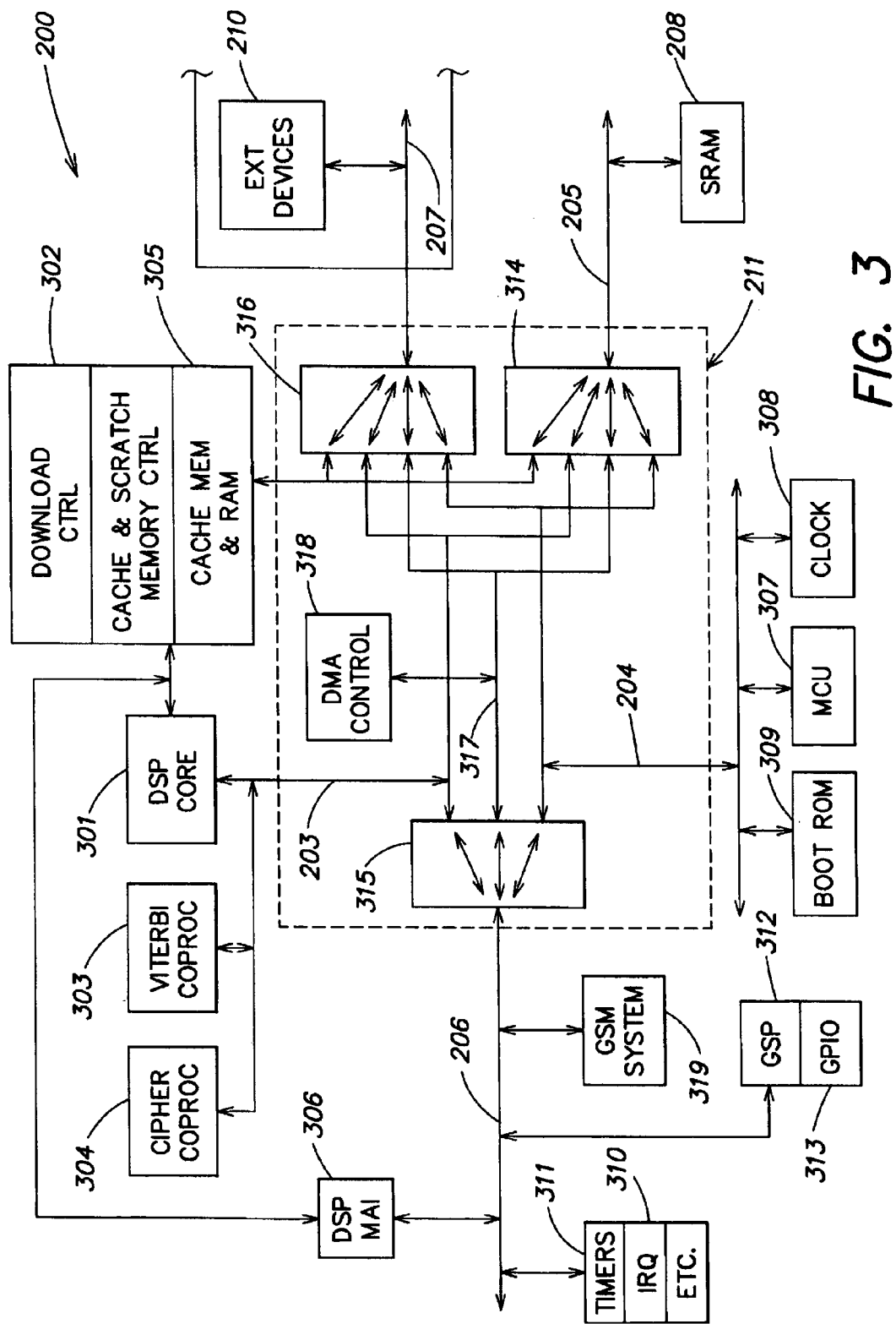
FIG. 3 is a more detailed block diagram of the bus architecture of FIG. 2.
Figure 4:
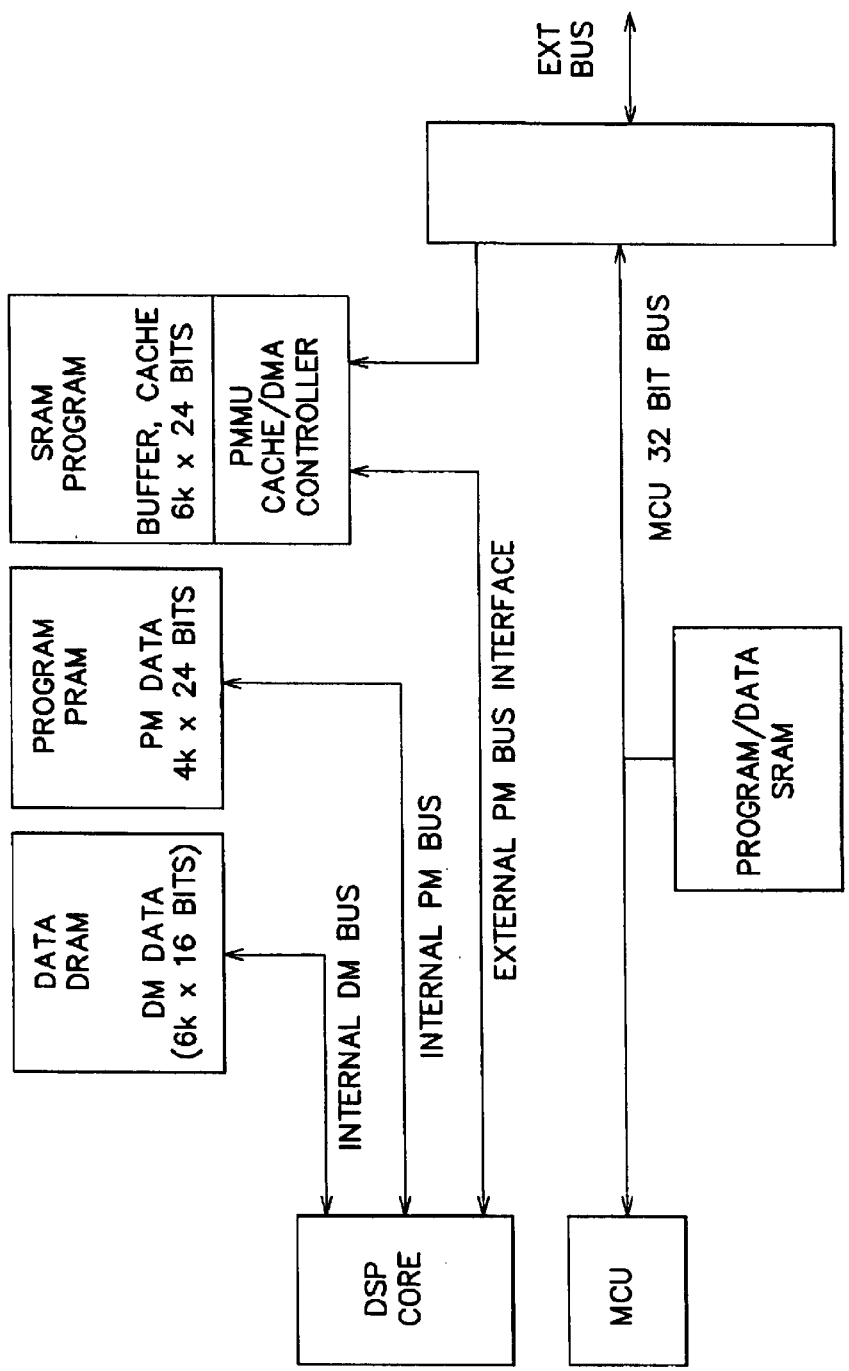
FIG. 4 is a block diagram of a portion of the system of FIGS. 2 and 3 showing the cache system.

The illustrative embodiment is now described in greater detail, in connection with FIG. 3. First, the DSP subsystem 201 is described.

At the heart of the DSP subsystem 201 is an Analog Devices 218X DSP core 301. Other types of DSP core 301 could be used, including those implemented as part of an MCU or other devices implementing DSP capabilities in hardware or software. Also included in the DSP subsystem 201 are a memory management system 302 including a download controller, cache and scratch memory controller and cache memory, and DSP-specific peripherals including a Viterbi co-processor 303 and a generic ciphering engine 304. The functionality of such DSP specific peripherals could be implemented in the DSP or external hardware and/or software.

Notably absent from the DSP subsystem 201 is an internal read only memory (ROM). Instead, DSP code is dynamically downloaded or cached into the DSP cache memory 305. By employing a cache memory 305, the downloading of DSP code occurs transparently to the user. By using conventional caching techniques, not all of the DSP code required for a particular function, for example a speech encoder, need be downloaded at any particular point in time. Rather, only those fragments needed immediately for use by the DSP need be downloaded, resulting in less memory being required within the DSP subsystem 201. Although the foregoing discussion demonstrates that the DSP subsystem 201 does not require an internal ROM, one could be included if desired, without departing from the spirit of the invention.

DSP code can be loaded into the cache from either internal system memory 208 or from an external memory, for example flash ROM connected as an external device 210 to bus 207. Taking advantage of such flexibility minimizes conflicts between the DSP subsystem 201 and the MCU subsystem 202 with respect to memory access. Critical code should be placed where the minimum overhead and latency will be imposed during actual system operation.

For maximum flexibility with respect to software partitioning, all bus systems 204, 205, 206 and 207 are accessible by the DSP subsystem 201 through DSP bus 203 and BAM 211.

The DSP subsystem 201 also has some internal static RAM 305, which can be used for code having critical timing requirements and for data. The internal static RAM 305 of the DSP 301 is also accessible to the MCU subsystem 202 via a memory access interface (MAI) module 306 connected to the peripheral bus 206.

The MCU subsystem 202 includes an ARM7TDMI MCU core 307 (from ARM Ltd. of the United Kingdom) or other suitable MCU access. The MCU subsystem 202 further includes clock generation circuits 308 and a small ROM 309 containing bootstrap code for loading externally stored software.

The memory 208 of the illustrative embodiment is an internal static RAM (SRAM) for storing data and code. It is accessible to both the DSP subsystem 201 and the MCU subsystem 202 through their respective buses 203 and 204, when connected to the memory bus 205 through the BAM 211. Time critical MCU subsystem code can be placed in this memory, to separate it from the time critical code for the DSP subsystem. Less time critical DSP code can be also stored in static RAM 208.

The peripheral subsystem 209 includes a generic interrupt controller 310, a generic timer 311, a generic serial port 312, a general purpose input/output (GPIO) port 313 and a GSM I/O system 319. The generic interrupt controller 310 collects all of the interrupts received by the system, groups them together in software configurable groups and assigns them a priority level. Thus, a fully programmable interrupt priority scheme is implemented. In the illustrative embodiment, three independent interrupt controllers (not shown) also exist, one for each of the DSP subsystem 201, the MCU subsystem 202 and internally to the BAM 211. The generic timer module 311 is a fully software configurable timer module, used to maintain system timing. The timer module can generate interrupts and set or clear external connections to the device 200. The generic serial port 312 is a fully software programmable sequencer with specific hardware for implementing serial port standards. The generic serial port 312 can be programmed to serve most known serial standards. Thus, each user of device 200 can create unique hardware specific serial interfaces without modifying any of the internal structures of device 200. The GPIO 313 functionality allows various external connections to device 200 to be used for any particular unique hardware or software specific interface requirements.

The external bus 207 provides a high-speed connection to the device 200 suitable for connecting elements such as flash ROM, requiring a parallel interface.

As described above, all of the buses 203, 204, 205, 206 and 207 are interconnected through the bus arbitration module (BAM) 211. The bus arbitration module includes three arbitration units 314, 315 and 316 and a direct memory access (DMA) subsystem including a DMA bus 317 and DMA controller 318 described below.

As will be described below, in part by having a separate arbitration unit for each slave bus, the BAM 211 is constructed and arranged to avoid blocking when multiple bus masters each request access to resources connected to the different slave buses. The three bus arbitration units 314, 315 and 316 each correspond to one of the three principal system buses, the memory bus 205, the peripheral bus 206 and the external bus 207, respectively. The three arbitration units 314, 315 and 316 are structurally identical (the arbitration methods can be different), but are each dedicated to their own bus 205, 206 and 207.

One arbitration unit 314 selectively connects the memory bus 205 to one of the DSP bus 203, the MCU bus 204, the DMA bus (discussed below) or the DSP cache.

A second arbitration unit 315 selectively connects the peripheral bus 206 to one of the DSP bus 203, the MCU bus 204 and the DMA bus (discussed below).

A third arbitration unit 316 selectively connects the external bus 207 to one of the DSP bus 203, the MCU bus 204, the DMA (discussed below) and the DSP cache.

It should be evident that the structure illustrated in FIG. 3 is non-blocking, as now discussed. Bus masters, e.g., DSP core 301 and MCU 307, are each connected to their own bus. Local communication by a bus master on its own bus in completely independent of local communication by another bus master on its own bus. Resources, i.e., bus slaves, are distributed among plural slave buses, e.g. buses 205, 206, 207. If one bus master requests access to a resource on one slave bus and another bus master requests access to another resource on another slave bus, no blocking occurs because independent arbitration units handle the separate requests. Thus, the designer can optimize the design by separating shared resources according to which bus master is the primary user of the resource. Other non-blocking structures are possible, using, for example a multi-port, non-blocking parallel switch structure can be used.

The separation of shared resources can be done as follows. If the DSP core 301 uses a first resource more than the MCU 307, but the MCU 307 uses a second resource more than the DSP core 301, then the first and second resources should be attached to different slave buses.

Each arbitration unit 314, 315, 316 grants access to its bus 205, 206, 207 according to the method described below. An active bus select signal from a requester to the arbitration unit 314, 315, 316 indicates a request for access and arbitration. The arbitration unit 314, 315, 316 either returns a wait signal for delaying access or grants the access. When the bus select signal of a requester granted access becomes inactive, it indicates to the arbitration unit that the next arbitration cycle can start.

To maximize the performance of the device 200, the DSP cache access can be performed in a block mode, reading (for example) up to 12 words at a time. In the illustrative embodiment, words are 16 bits long, however other lengths can be used as required by particular bus designs as known in the art. Thus full advantage can be taken of the bandwidth provided by, for example, flash ROM, connected as an external device 210 to the external bus 207. The method of arbitration is discussed in greater detail in Søerensen, Serial No. 09/706,577.

The DMA subsystem of the bus arbitration module includes a DMA bus 317 and a multi-channel DMA controller 318. In the illustrative embodiment a 16 channel DMA controller 318 is used. The DMA controller 318 is a bus master, like the DSP core 301 and MCU 307. The DMA bus 317 interconnects the three arbitration units 314, 315, 316, so that a DMA can be performed between devices connected to any of the three buses, the memory bus 205, the peripheral bus 206 and the external bus 207. Data or code can be transferred from any address location on one of the three buses 205, 206 and 207 to any address location on another of the three buses 205, 206 and 207. The DMA controller 318 includes one word of transfer memory which is the memory used to perform the transfer mentioned above and described in detail below. The DMA controller 318 also includes other memory used for purposes known in the art. Other memory sizes could be used, if desired for a particular purpose. The DMA controller 318 reads in one word from a source location during a first memory cycle then writes the word out to a destination location during a second, subsequent memory cycle.

The DMA controller 318 governs the operation of the DMA bus 317. The DMA controller 318 handles data transfers for both interrupt-driven I/O devices and for memory devices. The DMA controller 318 includes separate full duplex channels with identical functionality. Each channel is controlled and configured by either the MCU subsystem 202 or the DSP subsystem 201 through the peripheral bus 206. After the DMA controller 318 transfers a programmable number of address locations, it gives an interrupt to the interrupt controller 310.

The DMA controller 318 can perform the following tasks, giving additional functionality to the system. A RAM buffer can be created between an I/O device and, for example, the MCU subsystem 202. Thus, the number of interrupts required to handle I/O data can be reduced. In such an instance, the DMA controller transfers a block of a predetermined or programmable number of words of data between a memory module, such as SRAM 208 and the I/O peripheral within the peripheral subsystem 209. The DMA controller can move a block of data, such as a table or program, from a flash ROM, among the external devices 210, to the internal DSP subsystem data memory, program memory or cache. Finally, the DMA controller can effect the copying of any large memory blocks from one location to another in the system, as may be required.

The DSP cache controller or program memory management unit (PMMU) manages the DSP's instruction memory system with some software assistance such that a limited amount of dedicated DSP RAM will allow sufficient DSP performance. The time spent waiting for memory fetches from external FLASH or system SRAM should be minimized. At the same time, the PMMU should limit the complexity of the software assistance and the amount of software overhead to handle code download and relocation.

Figure 5:
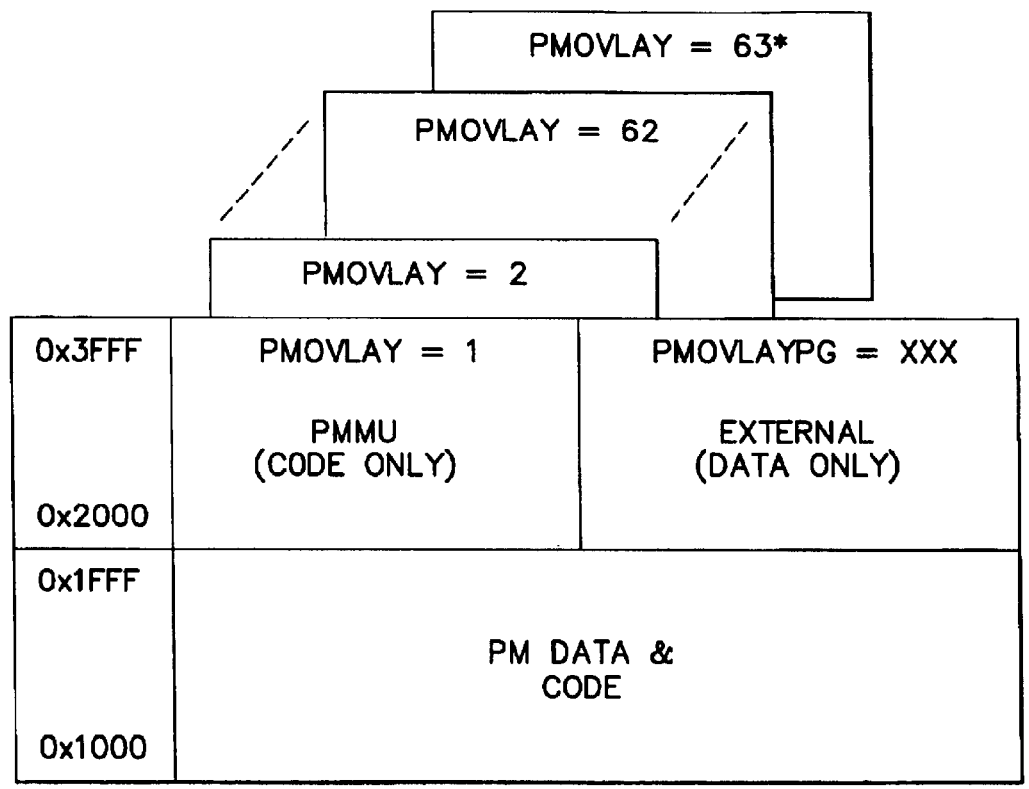
FIG. 5 is a program memory map.

The DSP program memory map is shown in FIG. 5. The DSP has an expanded address range and unique restrictions on the location of data in program memory.

The address range has been expanded by use of a PMOVLAY register. This register can be set from 0 to 1023, effectively expanding the DSP's instruction address range to 512K words. Note the value of PMOVLAY has no effect on data accesses in the upper 8K. These accesses are mapped to an external 8K memory space. The lower 8K of program space contains an internal RAM that can be used for both code and data. This portion of memory is always present as in the conventional DSP cases.

It should be noted that although the PMOVLAY register is in fact 10 bits the PMMU only uses 7 of them. PMOVLAY [5:0] select one of the available 64 pages. PMOVLAY[6] is a control bit that enables a mode of operation called "Direct Execution". This will be explained in greater detail in the following sections.

The PMMU/cache unit is mapped into the overlay section of PM space. All instruction fetches to the upper 8K of the DSP's normal 14-bit address space are sent to the PMMU along with the 6-bit value of the PMOVLAY register. This effectively gives a 19-bit (512K) address space for code. A direct mapped cache is used to determine what code is currently resident in the 2K cache memory.

Figure 6:
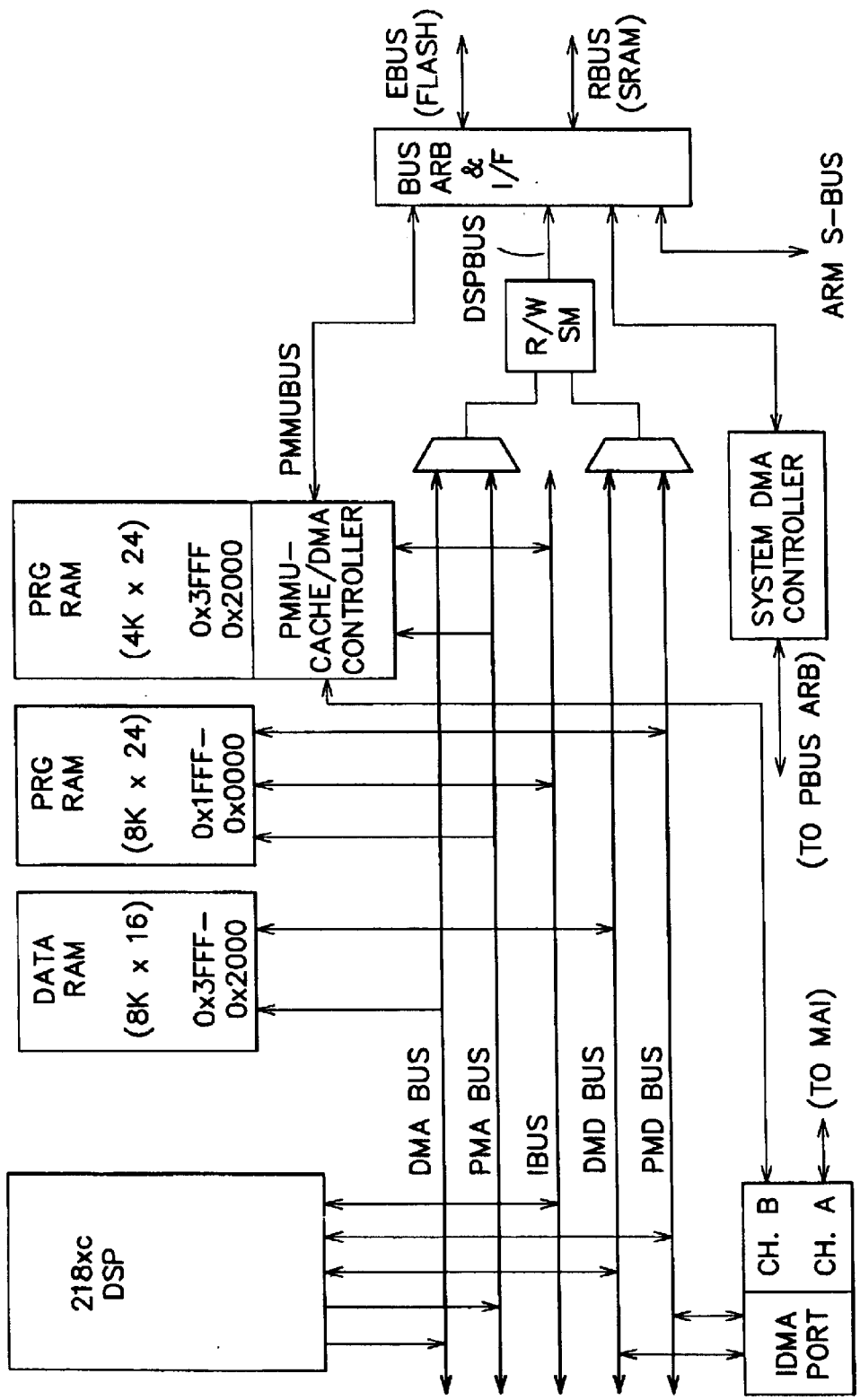
FIG. 6 is a more detailed block diagram of the system of FIG. 5.

The PMMU is located on the internal instruction bus (IBUS) and internal address bus (PMABUS) of the DSP (see FIG. 6). This ensures that instruction fetches do not tie up the external bus and further reduce performance. Control registers and the tag memory are memory mapped into the DSP's I/O space, in a zero-wait state region. The PMMU has access to the off-chip interface (via EBUS) and the system RAM (via RBUS) through the EBUS and RBUS arbitration units as shown in FIG. 6. These buses are accessed by the PMMU's download controller or when executing directly from FLASH or system RAM. The ARM microprocessor, centralized SysDMA controller, and the expanded I/O bus of the DSP (DSPBUS) also have access to these buses. See FIG. 6 for clarification.

Finally, the PMMU can also download code to the DSP core's internal program and data memories through the core's IDMA port. This interface is shared with the MAI peripheral, which is located on the PBUS.

Figure 7:
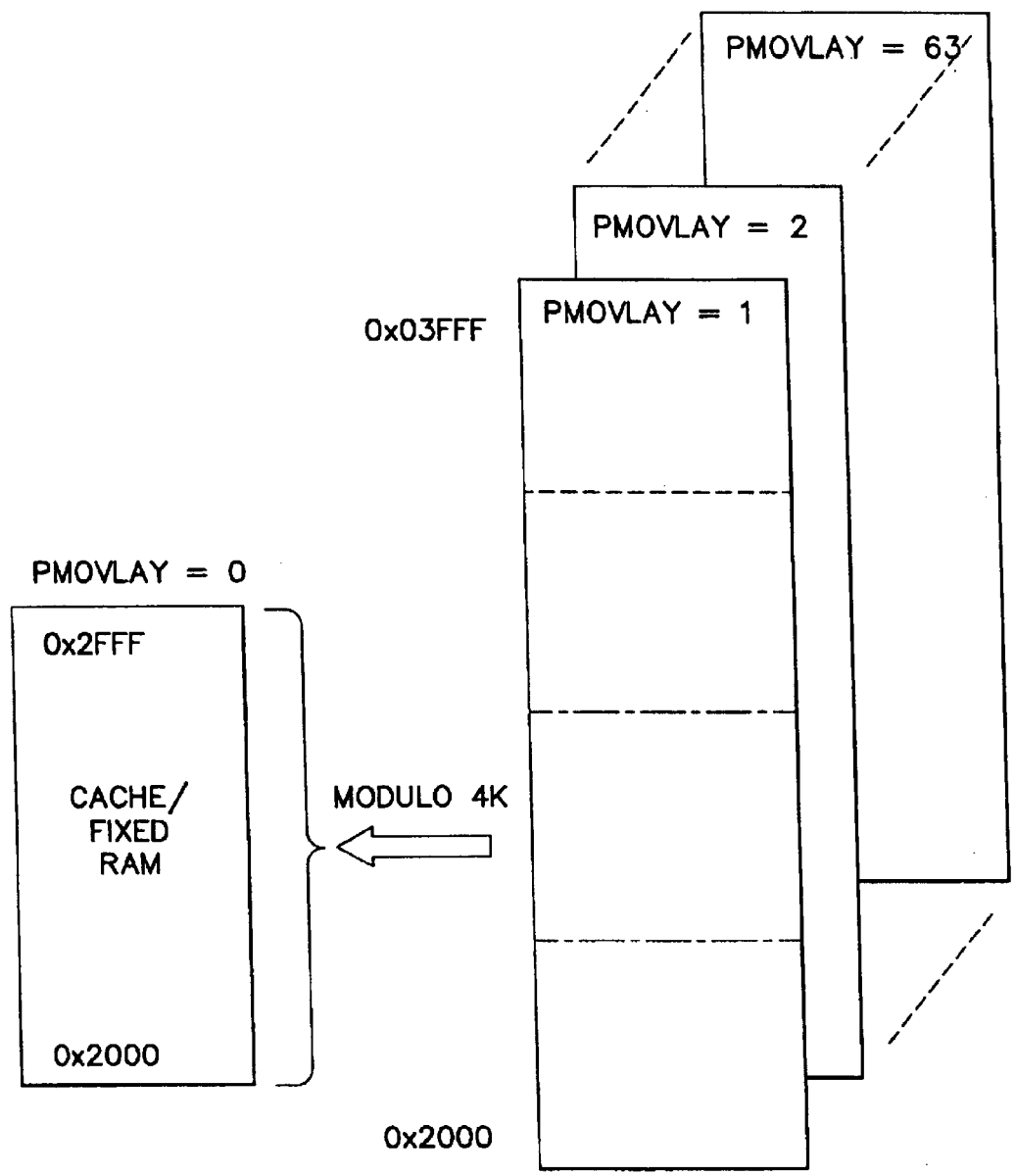
FIG. 7 is a memory overlay map.
Figure 8:
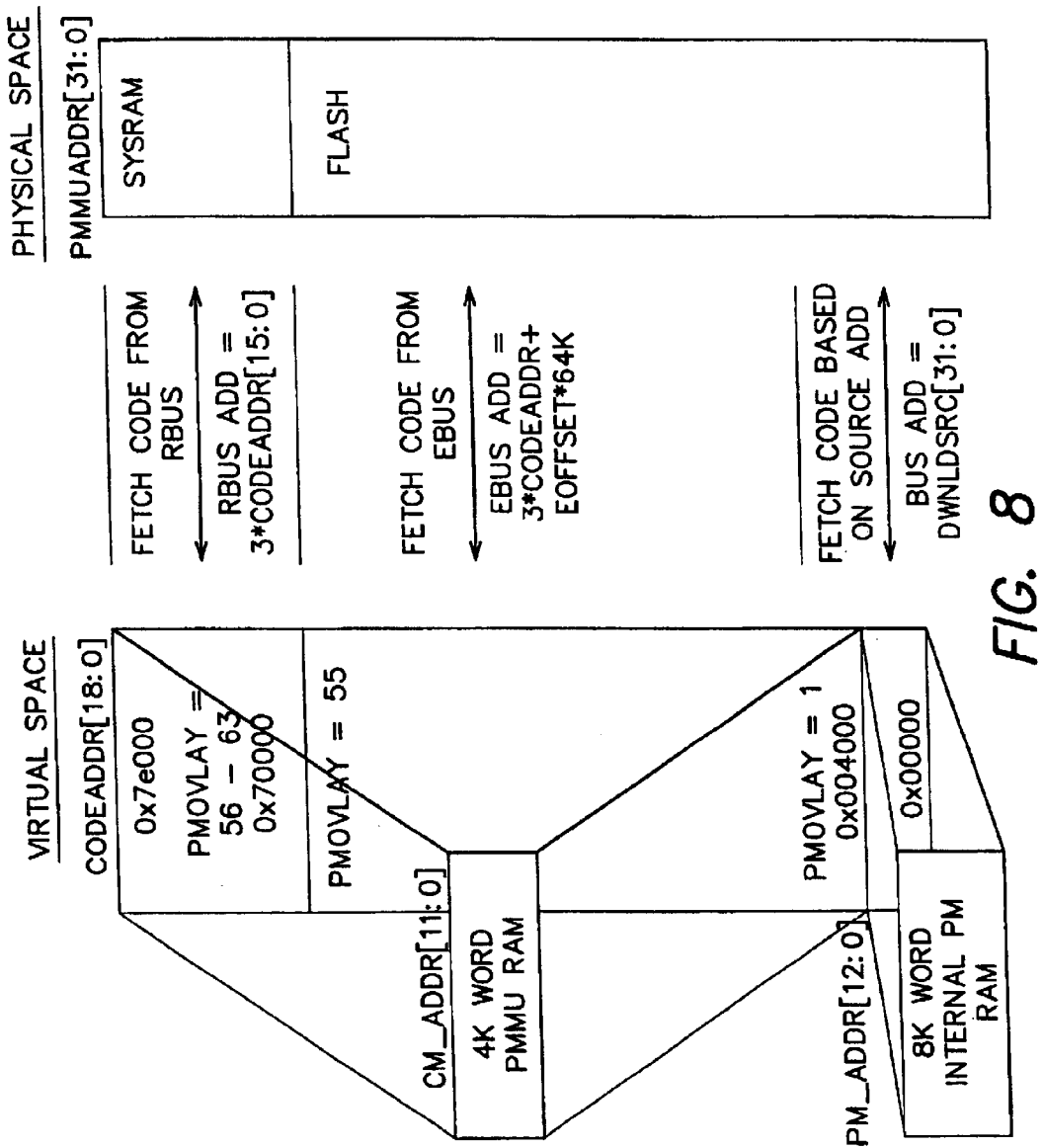
FIG. 8 is a physical memory map.

The PMMU manages this code space by determining where to find the requested instruction and either returning the instruction in a single cycle or indicating to the core that a cache miss has occurred and fetching the requested code block. A 4K direct mapped cache covers all code located in pages 1–63. Page 0 is a special page where the cache memory physically resides. See FIG. 7.

When operating in cache mode, page 0 should NOT BE USED. Accessing the cache in overlay 0 will result in unknown results since any portion of the cod may be resident in the cache at that time.

Overlay 0 is used to support TTP's dynamic download scheme, or simple applications where a total of 12K of PM space is sufficient. In both these schemes the cache simply becomes fixed memory, and the memory model is simply 12K of fixed PM RAM. The tag memory is disabled and Miss is always deasserted.

PMMU RAM can be downloaded by a zero-overhead DMA feature. This is unique from internal PM memory, which is a cycle stealing operation. The PMMU RAM is also unique in that it cannot obtain PM data. Attempting to access data from an address above 0x2000 results in an external memory cycle regardless of the PMOVERLAY setting.

The entire 512K virtual code space has a corresponding physical memory location in either FLASH or system memory. A forced partition has the upper 8 pages being mapped into the system RAM and overlays 1–55 mapped to FLASH. Overlay 0 (not shown below) and the lowest 8K of PM memory do not have a direct mapping to a particular source location as the source address of the code to be downloaded is programmable.

The PMMU can initiate a request to slower memory through the PMMU's download controller interface. This request occurs over the PMMUBUS. These requests, which can come from two primary sources, have the following priority and action:

| (1) Cache Miss | Fetch 8 instructions - stalls processor |
| (2) SW Download | Load N x 8 instructions - transparent to DSP |

A cache miss is of highest priority because the DSP is effectively stalled at this point. Although able to respond to interrupts, the DSP is effectively in idle. A cache miss results in 8 instructions being fetched from external memory and written in the cache before execution resumes. The software download has two purposes. One is simply to load code or data into RAM before execution begins, and the second is to support a dynamic download mode where code or data is loaded during operation to either reduce the cache miss rate (aka cache preload) or execute efficiently in a small memory system (aka TTP dynamic download).

The PMMU DMA controller deals appropriately with each of these 2 requests with the priority listed above. As far as the user is concerned there are a few things to keep in mind. The bandwidth given to the PMMU is greatly affected by the current system state as well as by programmable features such as arbitration unit settings for example. Downloads are given lesser priority to EBUS and are often of large number of words, and thus are more greatly affected by MCU and DMA controller activity.

Software download is the only type of download under complete software control and thus deserves special attention. The download controller is responsible for downloading to both internal fixed RAM and PMMU RAM, which includes both direct mapped cache and overlay 0 portions, and provides a consistent interface to do this. However, the actual mechanism to complete the download is quite different. Downloads to fixed memory actually take place through the core's IDMA port and thus are a cycle stealing operation resulting in a loss of one DSP cycle per instruction downloaded. Data can also be downloaded to fixed PM and DM through this IDMA interface. Downloads to PMMU RAM, which are not cycle stealing and are transparent to system performance, take place through a specialized interface to the PMMU RAM. Data cannot be downloaded to this memory.

The process to initiate a download is as follows:
1. The DWNLDDONE bit of PMMSR must be checked to make sure no other software downloads are in progress. Attempting to initiate a new SW download while one is in progress is an error, which will result in the BADDWLDINT being generated and the setting of BadDwld status bit. This new request will be ignored.

2. If the download is to fixed RAM or to overlay 0 then a source address must be provided before the write to PMMDWLD2 below. This 32-bit address is written to using registers DWLDSRC1 and DWLDSRC2. The source address is specified as a byte-address in system space. If the download is to cache, the DWLDSRC register is not used since the source is calculated from the destination address.

3. Next PMMDWLD1 is written with the destination block address. For downloads to cache this is code's virtual address/8 (codeaddr[19:3])., for downloads to fixed memory this is a 10-bit value (0000-1FFF right shifted by 3), and for downloads to PMOVLAY 0 this is a 9-bit value (000-FFF right shifted by 3).

4. Next PMMDWLD2 is written with DwldType (determines destination), Download Block Size (2 or 4 words) and Word Count (8–8048 in multiples of 8). This write to DWLD2 initiates the transfer so care must be taken in the order the registers are written. Dwld-Type selects the destination as follows:

| DwldType[1:0] | DESTINATION |
| --- | --- |
| 00 | PMOVLAY 0 |
| 01 | Cache |
| 10 | Fixed DM ram |
| 11 | Fixed PM ram |

The Download Block Size can be used to help tune the external bus usage. A smaller block size will result in reduced guaranteed DSP bandwidth as it will have to arbitrate more, but will free up that bandwidth for others to use.

Upon completion of the entire download, the DWLDDONEINT will be generated and will be indicated in the status register. This will allow the SW to monitor the completion of the download and take appropriate action such as to schedule the next download. This could in a dynamic download environment call the download kernel to determine the next task. The DWLDDONEINT is cleared by either initiating a new download or writing a 0 to the bit in the control register.

SW downloads can be terminated or halted in 2 ways: one by SW and another by HW. The SW method is by writing to the Abort bit of the PMMSCR control register. This aborts the download at the nearest point. This is intended to be used in the case where a branch has caused the download to be of no use, or in context switches. In the latter case the DW must read the current address of the download, and save away the PMMU status so the download can be restarted from its current point when context is restored. The hardware method has the same result. A primary input BREAK causes the download controller to abort the current download. This is intended to be used for DSP emulation where the download should be aborted when the DSP has hit a breakpoint.

SW downloads have a potential error condition that results when the instruction to be executed has not yet been downloaded. This is handled differently for different regions of memory. Cache memory has a built in protection mechanism since this will simply result in a cache miss. The SW download will be pre-empted, and the cache block will be loaded. Upon completion of this, the SW download will continue where it left off after reacquiring the E/R BUS. The download controller's HW checks the tag of cache blocks to be loaded to make sure it is not attempting to load a block that is already present in the cache. This is especially useful in the case described above since it allows the download to again get in front of the code being executed as quickly as possible. Download to internal memory and PMOVLAY 0 have no HW protection or detection. It is up to the user's download kernel to make sure all needed pieces of SW are available before executing code.

The download controller is designed to minimize the latency of cache misses and complete downloads in a minimal amount of time. The download controller works entirely in DSPCLK. The ER Bus Interface described later is responsible for the synchronization of the bus interface back to DSPCLK. The download controller also operates on words and within the DSP's address space. The conversion of 16-bit data to 24-bit words and the source address translation into a system space address is also handled in the bus interface. This simplifies the download controller design.

Figure 9A:
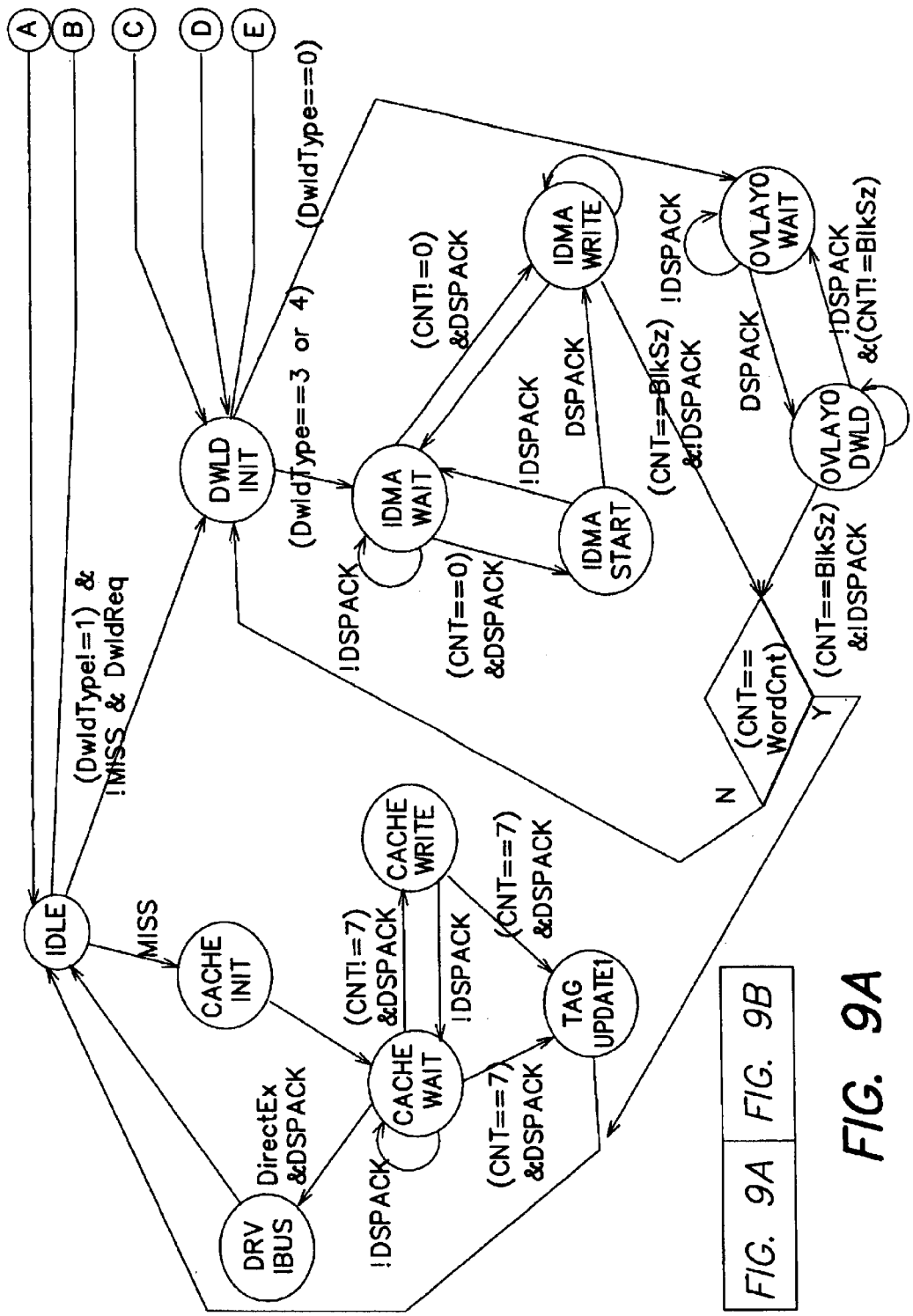
FIGS. 9A and 9B together are a state diagram of the PMMU of the system of FIGS. 4 and 6.
Figure 9B:
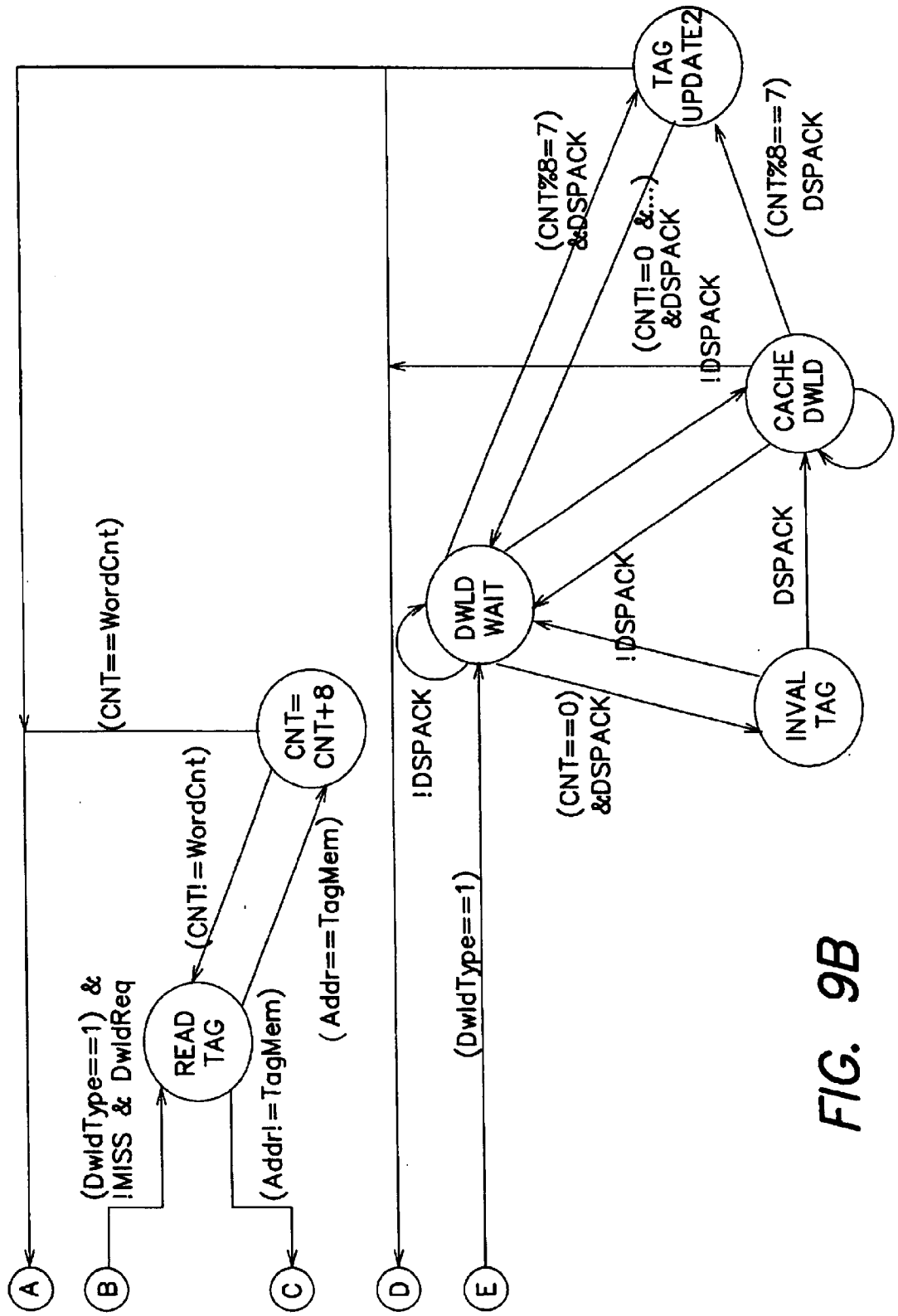

The basic state diagram is shown in FIG. 9. The majority of the states are related to downloading and downloading to cache in particular. The state machine can be , optimized in other ways known in the art. The download abort transitions are not shown.

The Download controller supports 2 channels and is able to switch from a download to a cache miss and then back to the download where it left off. Cache misses always complete once started. The download channel has 3 basic download modes: to cache, to PMOLVAY 0, and to fixed memory. The basic operation of the state machine is (1) wait for cache miss or download request, (2) request the bus interface initiate download (3) wait for DSPACK. (4) move word from buffer to destination, and (5) repeat until all requested transfers are completed.

This operation is further complicated by downloads Which are broken up into requests of size BlkSz, downloading to cache which requires the tags to be read and modified, channel changes, and the direct execution mode described in the next section. Downloading to cache is particularly tricky since we don't want to download cache blocks which are already resident and that downloading to cache requires careful control of the tags so that invalid instructions are not executed.

It is possible to disable cache replacement after a cache miss. This mode of execution is referred to as "Direct Execution" since the code is run directly from FLASH or system RAM albeit at a much slower rate. The code fetched from memory is simply driven directly to the IBUS rather than written back into the cache. In this mode misses are on an instruction by instruction basis rather than a block basis, i.e., after one instruction is fetched it is executed.

This mode can be enabled in two ways. The first is by control registers bits, ExeFLASH or ExeSRAM. This enables direct execution separately for code resident in FLASH and SysRAM respectively. The second is by PMOVLAY[6]. Setting PMOVLAY[6] =1 enables this mode for the current page value. For example, the SW can set PMOVLAY=66 to execute overlay 2 directly.

The cache HW is still active in this mode. If the user wants to completely disable all cache functionality, PMOVLAY 0 should be used instead. This mode then only affects the download controller and its response to a cache miss. On a cache miss, rather than write the instruction into cache memory, the PMMU provides it directly to the core to be executed and then returns to its IDLE state. After the core executes the single instruction, it will very likely request the next instruction which will also cache miss (since the tags are never modified in this mode) and the same process repeats. The only difference may be that a single 16-bit fetch may complete a word since an extra byte from the previous fetch may be able to be used.

This mode is intended for to allow the user to run portions of his code directly from the memory source rather than have to load it into cache first where it will have to overwrite something else. This is most useful for portions of the code that are linear with no loops as this type of code stream is not well suited for a cache. This mode is envisioned to happen on the fly under SW control and would be enabled in the code itself for particular section of the code. This mode also makes sense to simply enable this on RBUS such that all SRAM code is executed directly from SRAM and not cached. A final use is as a debug method. Changing PMOVLAY[6] to 1 causes the code to be executed externally where it can be observed.

Although it first appears that executing straight line code directly or from cache should take the same amount of time, the direct execution mode is actually slower. This is due to the fact that each instruction read requires a new memory request and thus many more external bus grants by the arbitration units.

The present invention has now been described in connection with a number of specific embodiments thereof. However, numerous modifications, which are contemplated as falling within the scope of the present invention, should now be apparent to those skilled in the art. Therefore, it is intended that the scope of the present invention be limited only by the scope of the claims appended hereto.

What is claimed is:

1. A digital signal processing system comprising:
   a digital signal processor (DSP) performing real-time processing of digital audio signals;
   a modifiable non-volatile program storage memory connected through a bus to the DSP, the modifiable non-volatile program storage memory holding program instructions including at least one software instruction to preload additional program instructional from the modifiable non-volatile program storage memory;
   and a cache memory system connected to the DSP and to the modifiable non-volatile program storage memory, the cache memory system having a cache memory and a program memory management unit which loads program instructions including the at least one software instruction from the modifiable non-volatile program storage memory into the cache memory and preloads the additional program instructions from the modifiable non-volatile program storage memory in response to loading and executing the at least one software instruction previously loaded from the modifiable non-volatile program storage memory, such that the additional program instructions are loaded into the cache memory before a cache miss for the program instructions occurs.

2. A multi-processor data processing system, comprising:
   a first processor;
   a second processor;
   a first shared resource operably connected to the first and second processors, the first shared resource holding program instructions including at least one software instruction to preload additional program instructions from the first shared resource;
   a cache memory operably connected to the first processor and to the first shared resource, whereby information can be transferred from the first shared resource to the first processor both directly and through the cache memory; and
   a cache memory controller which loads program instructions including the at least one software instruction from the first shared resource into the cache memory and preloads the additional program instructions from the shared resource in response to loading and executing the at least one software instruction previously loaded from the modifiable non-volatile program storage memory, such that the additional program instructions are loaded into the cache memory before a cache miss for the program instructions occurs.

3. The system of claim 2, further comprising:
   an arbitration unit operable to effect a connection between the first shared resource and the first and second processors, the arbitration unit selecting a respective one of said processors to which to grant access to the first shared resource, such that each of the first and second processors has available a maximum possible bandwidth without blocking.

4. The system of claim 2, further comprising:
   a second shared resource operably connected to the first and second processors, the first and second shared resources having different access cycle times.

5. The system of claim 2, further comprising:
   a sequence of software instructions executing on the first processor which include the at least one software instructions causing the cache memory controller to preload the cache memory with information from the shared resource before the cache miss occurs.

6. The system of claim 2, wherein the first processor and the second processor have different maximum resource access speeds.

7. The system of claim 6, wherein the maximum resource access speed of the first processor exceeds a maximum access speed of the shared resource.

8. The system of claim 2, further comprising:
   a second shared resource connected to the first and second processors; wherein
   the cache memory is also connected to the second shared resource, whereby information can be transferred from the second shared resource to the first processor both directly and through the cache memory.

9. The system of claim 8, wherein the first and second shared resources are mapped for addressing to separate spaces of a multi-bit address space.

10. An integrated circuit device comprising:
    a first data processor connected to a first native processor bus;
    a second data processor connected to a second native processor bus;
    the first and second native processor buses being operably connected through an arbitration unit to a memory bus;
    a shared memory connected to the memory bus, the shared memory holding program instructions including at least one software instruction to preload additional program instructions from the shared memory;
    a cache memory connected to the first data processor and connected through the arbitration unit to the memory bus; and
    a cache memory controller which loads the program instructions including the at least one software instruction, from the shared memory into the cache memory and preloads the additional program instructions from the shared memory in response to loading and executing the at least one software instruction previously loaded, from the shared memory, such that the additional program instructions are loaded into the cache memory before a cache miss for the program instructions occurs.

11. The device of claim 10, wherein the arbitration unit is operable to programmably allocate bandwidth on the memory bus to the first and second data processors.

12. The device of claim 10, further comprising:

a memory controller connected to the memory bus, the memory controller being operable to control plural different memory types requiring different lengths of wait states, the memory controller having programmable length wait states.

13. The device of claim 10, wherein the cache memory is a direct mapped type.

14. The device of claim 10, further comprising:

a local memory bus through which the cache memory is connected to the first data processor; and a local memory connected to the first data processor through the local memory bus.

15. The device of claim 14, wherein the local memory is a program store from which the first data processor fetches instructions for execution.

16. The device of claim 10, wherein the cache memory is dynamically loaded from the shared memory.

* * * * *